United States Patent [19]
Walter

[11] 3,817,155
[45] June 18, 1974

[54] HYDRAULIC RACK AND PINION STEERING GEAR

[75] Inventor: Wolfgang Walter, Schwabisch Gmund, Germany

[73] Assignee: Zahnradfabrik Friedrichshafen AG, Friedrichshafen, Germany

[22] Filed: Dec. 1, 1972

[21] Appl. No.: 311,110

[30] Foreign Application Priority Data
Dec. 1, 1971 Germany............................ 2159487

[52] U.S. Cl. ................................................. 92/167
[51] Int. Cl............................................ F16j 15/18
[58] Field of Search ............. 92/165, 167, 136, 168, 92/166; 277/30; 308/3.5

[56] References Cited
UNITED STATES PATENTS

| | | | |
|---|---|---|---|
| 1,747,968 | 2/1930 | Braren | 92/167 |
| 2,069,443 | 2/1937 | Hill | 277/30 |
| 3,037,485 | 6/1962 | Adams | 92/166 |
| 3,311,030 | 3/1961 | Halstead | 92/167 |

FOREIGN PATENTS OR APPLICATIONS

| | | | |
|---|---|---|---|
| 988,434 | 4/1965 | Great Britain | 277/30 |
| 10,498 | 2/1900 | Norway | 277/30 |

Primary Examiner—Manuel A. Antonakas
Assistant Examiner—R. H. Lazarus
Attorney, Agent, or Firm—Zalkind, Hornet & Shuster

[57] ABSTRACT

The reciprocating rack of a fluid operated steering gear is provided with a piston resiliently mounted for radial displacement relative to the rack to accomodate lateral flexure of the rack at the piston sealing point separating opposed pressure chambers. An end sealing device for one of the pressure chambers is carried on the free end of a pivotally mounted, tubular support and cooperates with the piston sealing arrangement to minimize friction and leakage resulting from flexure of the rack under load.

11 Claims, 3 Drawing Figures

PATENTED JUN 18 1974

HYDRAULIC RACK AND PINION STEERING GEAR

This invention relates to a hydraulically operated rack and pinion type of steering gear for motor vehicles or the like.

In a steering gear of this type, the spur gear rack is reciprocated along its longitudinal axis by a fluid servo motor having a cylinder in which a pair of opposed pressure chambers are formed coaxially about the rack, separated by a piston assembly attached to the rack. The pressure chambers are accordingly sealed at three sealing points along the axis of the rack including end sealing points and an intermediate point formed by the piston assembly between the two pressure chambers. This arrangement creates problems not only because of axial bearing alignment but also because of bending of the rack caused by lateral loading. Since the intermediate sealing point within the fluid servo cylinder is radially fixed, excessive friction develops from lateral bending producing rapid wear and leakage between the pressure chambers of the servo motor. Under rough travelling conditions of a vehicle, shearing forces of 200 kilopounds are applied, for example, to the steering gear rack at a frequency of 15 Hz. The rapid radial movements imposed by such loading on a piston assembly rigidly mounted on the rack, cannot be followed by the sealing material on the piston.

In an attempt to cope with this problem, bearing bushings with rubber sleeves were proposed for the rack. This solution was not satisfactory because the precise concentricity and radial strength required for such bearings could not be achieved.

It is therefore an important object of the present invention to establish three sealing point assemblies for a hydraulic steering gear of the rack and pinion type capable of absorbing and compensating for the radial and lateral stresses applied to the rack under load, without disturbing the steering function.

In accordance with the present invention, the piston assembly axially fixed to the rack is provided with an elastically mounted sealing ring axially fixed on the rack but capable of being radially displaced to accomodate flexure or bending of the rack without loss of sealing contact with the cylinder, and a sealing assembly at an axial end of one of the pressure chambers carried on the free end of a tubular support surrounding the rack. The tubular support is pivotally attached and axially fixed to the housing by a lockring seated in a recess of the rack between a pair of discs, one of which is held in place by the end of the cylindrical section of the steering gear housing. The other disc of smaller diameter abuts a resilient sealing ring encircling the end of the tubular support. The free end of the tubular support is radially enlarged to mount the end sealing assembly and to reduce the radial clearances limiting displacement relative to the cylindrical housing section.

As a result of the foregoing arrangement of sealing assemblies on the piston and the end of one of the pressure chambers, friction at the sealing points is minimized despite lateral stresses applied to the rack and leakage is reduced.

Figure 1:
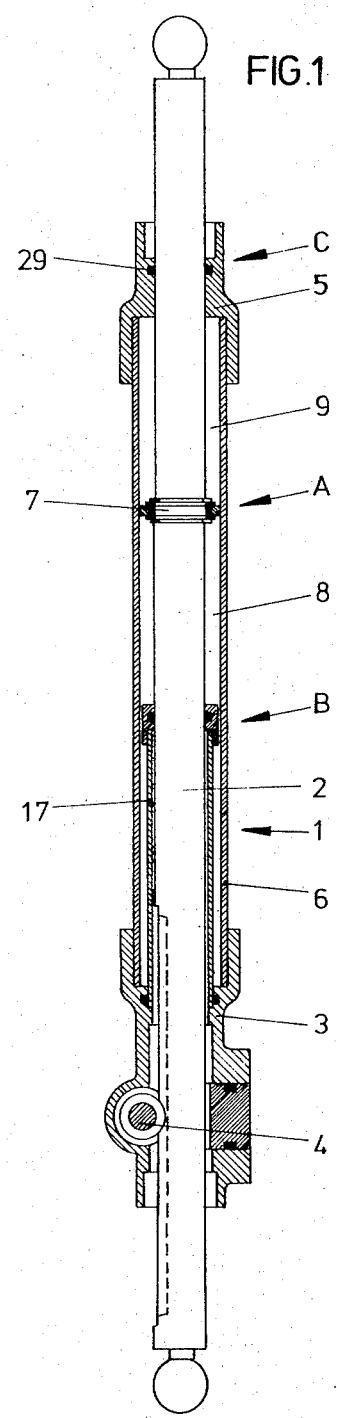
FIG. 1 is a side section view of a hydraulic rack and pinion steering gear showing the sealing arrangement of the present invention.
Figure 2:
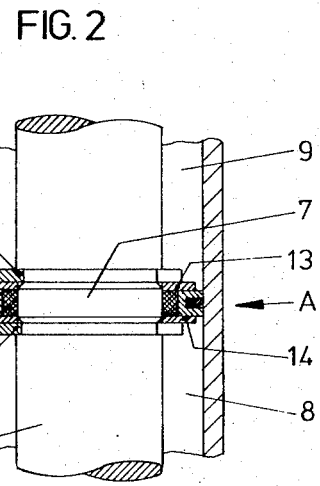
FIG. 2 is an enlarged partial section view showing the sealing arrangement at one location in the steering gear.

Referring now to the drawings in detail, FIG. 1 shows a steering gear generally referred to by reference numeral 1, including a spur gear rack 2 mounted in an inner housing portion 3 for meshing engagement with a pinion 4 and supported in an outer housing section 5 which is interconnected with housing section 3 by an elongated cylindrical housing section 6. Opposite ends of the rack 2 are adapted to be connected with steering linkages (not shown) in a well known manner. A hydraulic piston assembly 7 divides the cylinder 6 into two opposed, servo motor pressure chambers 8 and 9. For sealing purposes, the piston assembly as more clearly seen in FIG. 2, includes a piston ring 10 having an external groove seating an elastic sealing ring 11. The piston ring is radially supported in coaxial relation on the rack 2 by a rubber ring 12. Radial deformation of the rubber ring 12 and radial displacement of the piston ring 10 are accomodated between spaced discs 13 and 14 on opposite axial sides, the discs being axially fixed in position on the rack by lock rings 15 and 16. As a result of the foregoing arrangement, the piston assembly will follow any flexure of the rack 2 because of lateral stresses or radial vibrations without any reduction in the sealing ability of the piston assembly at sealing point A.

Figure 3:
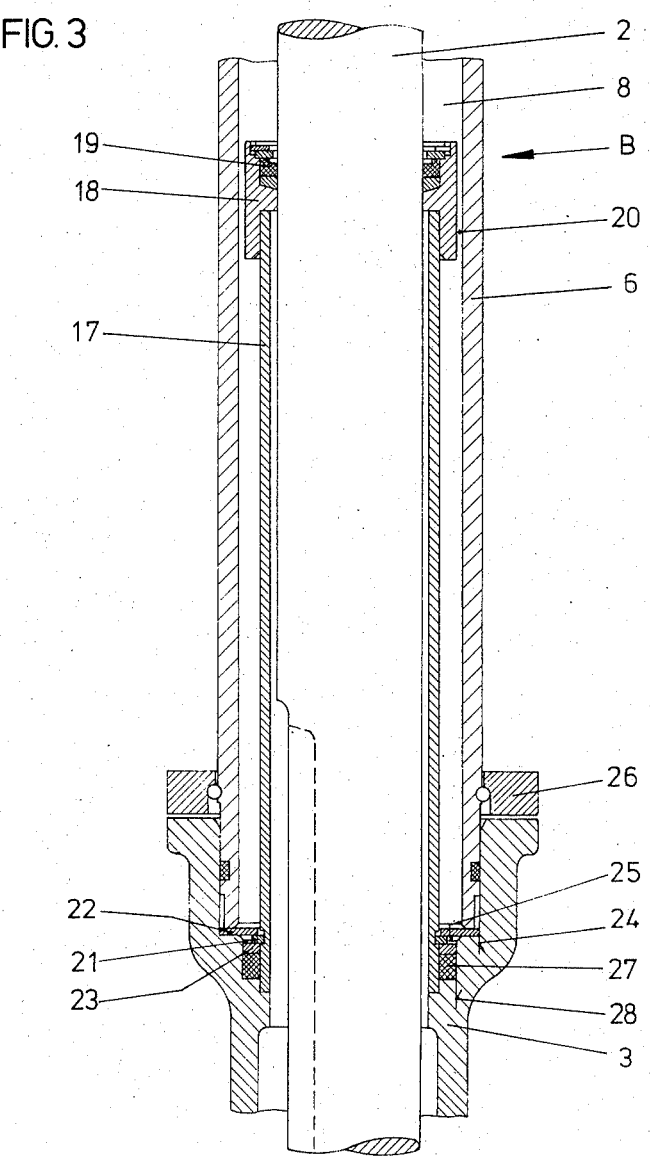
FIG. 3 is an enlarged partial section view showing the sealing arrangement at another location.

Another sealing point B at one end of the pressure chamber 8 opposite location A, is established with a sealing capability comparable to that at location A to accomodate the greatest possible flexure between housing sections 3 and 5 which form bearing points for the rack 2. As more clearly seen in FIG. 3, pressure chamber 8 is sealed at location B, by a sealing ring 19 carried by a radially enlarged portion 18 on the free end of a tubular support 17. The tube 17 is axially anchored at its other end to the housing section 3 so that end portion 18 may be radially displaced because of the flexibility of tube 17 and the radial clearance 20 between the housing section 6 and end portion 18. The tube 17 is anchored by a lock ring 21 abutting axial discs 22 and 23 on opposite axial sides thereof. The radially larger disc 22 is held clamped in a recess 24 formed in housing section 3, by the projecting end 25 of the cylindrical section 6 which is firmly connected to housing section 3 by means of holding ring 26. The housing section 6 may be connected in a similar manner to the housing section 5. The disc 23 of smaller diameter than disc 22 on the other side of lock ring 21, abuts a sealing ring 27 encircling the end of tube 17 within recess 28 of the housing section 3. A pendulum movement of the tube 17 is thereby accomodated within limits determined by radial clearance 20 so that the sealing ring 19 carried by end portion 18 may adapt itself to flexure of the rack 2 without reduction in its sealing effect.

During vibration of the rack 2, movement at sealing location B is very limited because of a clearance 20 of about 0.05 mm. Any substantial leakage past the sealing ring 19 otherwise resulting from high frequency vibrations, is thereby prevented.

A third sealing location C as shown in FIG. 1, seals the pressure chamber 9 about rack 2 within housing section 5 by means of sealing ring 29. Since the flexure of the rack intermediate the bearing points within housing sections 3 and 5 is at most a few tenths of a millimeter and the bearing points are spaced apart a relatively large distance, a pivotal bearing bushing is not required for housing portion 5.

I claim:

1. In combination with a fluid operated steering gear having an elongated housing, a rack extending through said housing, a piston axially fixed to the rack within the housing and spaced bearings slidably supporting the rack within the housing, the improvement residing in a sealing arrangement establishing a pair of pressure chambers on opposite axial sides of the piston within the housing, comprising resilient support means mounting the piston on the rack in wiping contact with the housing for radial displacement in response to flexure of the rack, a pair of sealing devices mounted by the housing for wiping contact with the rack on opposite sides of the piston, means supporting one of said sealing devices for limited radial displacement relative to the housing and means pivotally connecting the supporting means to the housing remote from said one of the sealing devices.

2. The combination of claim 8 wherein the resilient support means includes a support ring radially spacing the piston from the rack and means for axially fixing the support ring and the piston to the rack.

3. The combination fo claim 2 including a radial enlargement mounted on the free end of the tubular support receiving said one of the end sealing devices.

4. The combination of claim 3 wherein the radial enlargement has a minimum radial clearance relative to the housing of approximately 0.05 millimeters.

5. The combination of claim 1 wherein the pivotal supporting means includes a tubular support encircling the rack having an anchored end and a free end and means pivotally connecting the tubular support to the housing adjacent the anchored end, said one of the sealing devices being carried by the tubular support at said free end.

6. The combination of claim 1 wherein said supporting means includes a radially displaceable end portion remote from one of the spaced bearings, said one of the sealing devices being carried by the supporting means at said end portion.

7. In combination with a fluid operated steering gear having an elongated housing, a rack extending through said housing, a piston axially fixed to the rack within the housing and spaced bearings slidably supporting the rack within the housing, the improvement residing in a sealing arrangement establishing a pair of pressure chambers on opposite axial sides of the piston within the housing, comprising resilient support means mounting the piston on the rack in wiping contact with the housing for radial displacement in response to flexure of the rack, a pair of end sealing devices mounted by the housing for wiping contact with the rack on opposite sides of the piston, and means pivotally supporting one of said end sealing devices in axially spaced relation to an adjacent one of the spaced bearings for limited radial displacement relative to the housing, the pivotal supporting means including a tubular support encircling the rack having an anchored end and a free end and means pivotally connecting the tubular support to the housing adjacent the anchored end, said one of the sealing devices being carried by the tubular support at said free end, the housing including a bearing section and a cylindrical section within which the pressure chambers are formed, said pivotal connecting means comprising a lock ring axially fixed to the tubular support adjacent the anchored end, a pair of discs abutting the lock ring on opposite axial sides, means clamping one of the discs between the bearing and cylindrical sections of the housing and a sealing ring mounted on the tubular support in abutment with the other of the discs radially inwardly of the clamping means.

8. The combination of claim 7 including a radial enlargement mounted on the free end of the tubular support receiving said one of the end sealing devices.

9. The combination of claim 8 wherein the radial enlargement has a minimum radial clearance relative to the housing of approximately 0.05 millimeters.

10. In combination with a fluid operated steering gear having an elongated housing, a rack extending through said housing, a piston axially fixed to the rack within the housing and spaced bearings slidably supporting the rack within the housing, the improvement residing in a sealing arrangement establishing a pair of pressure chambers on opposite axial sides of the piston within the housing, comprising resilient support means mounting the piston on the rack in wiping contact with the housing for radial displacement in response to flexure of the rack, a pair of sealing devices mounted by the housing for wiping contact with the rack on opposite sides of the piston, and means pivotally supporting one of said end sealing devices in axially spaced relation to an adjacent one of the spaced bearings for limited radial displacement relative to the housing, the pivotal supporting means including a tubular support encircling the rack having an anchored end and a free end and means pivotally connecting the tubular support to the housing adjacent the anchored end, said one of the sealing devices being carried by the tubular support at said free end, and a radial enlargement mounted on the free end of the tubular support receiving said one of the end sealing devices.

11. The combination of claim 10 wherein the radial enlargement has a minimum radial clearance relative to the housing of approximately 0.05 millimeters.

* * * * *